United States Patent
Sowa et al.

(10) Patent No.: US 6,594,665 B1
(45) Date of Patent: Jul. 15, 2003

(54) STORING HASHED VALUES OF DATA IN MEDIA TO ALLOW FASTER SEARCHES AND COMPARISON OF DATA

(75) Inventors: Kurt E. Sowa, Shingle Springs, CA (US); Christopher M. McAllen, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 09/608,736

(22) Filed: Jun. 30, 2000

Related U.S. Application Data (60) Provisional application No. 60/183,557, filed on Feb. 18, 2000.

(51) Int. Cl.[7] .............................................. G06F 17/30
(52) U.S. Cl. ......................... 707/10; 707/101; 711/216
(58) Field of Search ............................... 707/1, 10, 100, 707/200, 101, 2, 206, 3, 4, 5, 102, 104.1; 711/216

(56) References Cited

U.S. PATENT DOCUMENTS

| | | | | |
|---|---|---|---|---|
| 5,542,087 A | * | 7/1996 | Neimat et al. ................. 707/10 |
| 5,893,086 A | * | 4/1999 | Schmuck et al. ............... 707/1 |
| 6,115,802 A | * | 9/2000 | Tock et al. ..................... 707/1 |
| 6,212,521 B1 | * | 4/2001 | Minami et al. ................ 707/1 |
| 6,212,525 B1 | * | 4/2001 | Guha ......................... 707/100 |
| 6,243,720 B1 | * | 6/2001 | Munter et al. .............. 707/200 |

* cited by examiner

*Primary Examiner*—Charles Rones
*Assistant Examiner*—Hassan Mahmoudi
(74) *Attorney, Agent, or Firm*—Blakely, Sokoloff, Taylor & Zafman LLP (57) ABSTRACT

A method and apparatus for locating data stored in memory are described. According to one embodiment, search data, such as the name of a file or directory to be located in memory, is received, and a hash function is performed on the search data to generate a search hash value. The computer uses the search hash value to search the memory by comparing the search hash value with hash values stored in memory that are associated with stored data, such as file or directory names stored in a directory page in a file structure. When the computer locates a stored hash value that matches the search hash value, it compares the search data with the stored data associated with the stored hash value to validate that the stored data matches the search data. If a data match is confirmed, the stored data has been located and the processing is complete; otherwise the search processing continues by looking for other stored hash values that match the search hash value.

22 Claims, 7 Drawing Sheets

STORING HASHED VALUES OF DATA IN MEDIA TO ALLOW FASTER SEARCHES AND COMPARISON OF DATA

This application claims the benefit of U.S. Provisional Application No. 60/183,557, filed Feb. 18, 2000, which is incorporated herein by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to hashing and searching techniques. More particularly, the invention relates to a method and apparatus for locating data utilizing a stored hash values derived from the data.

2. Description of the Related Art

Figure 1:
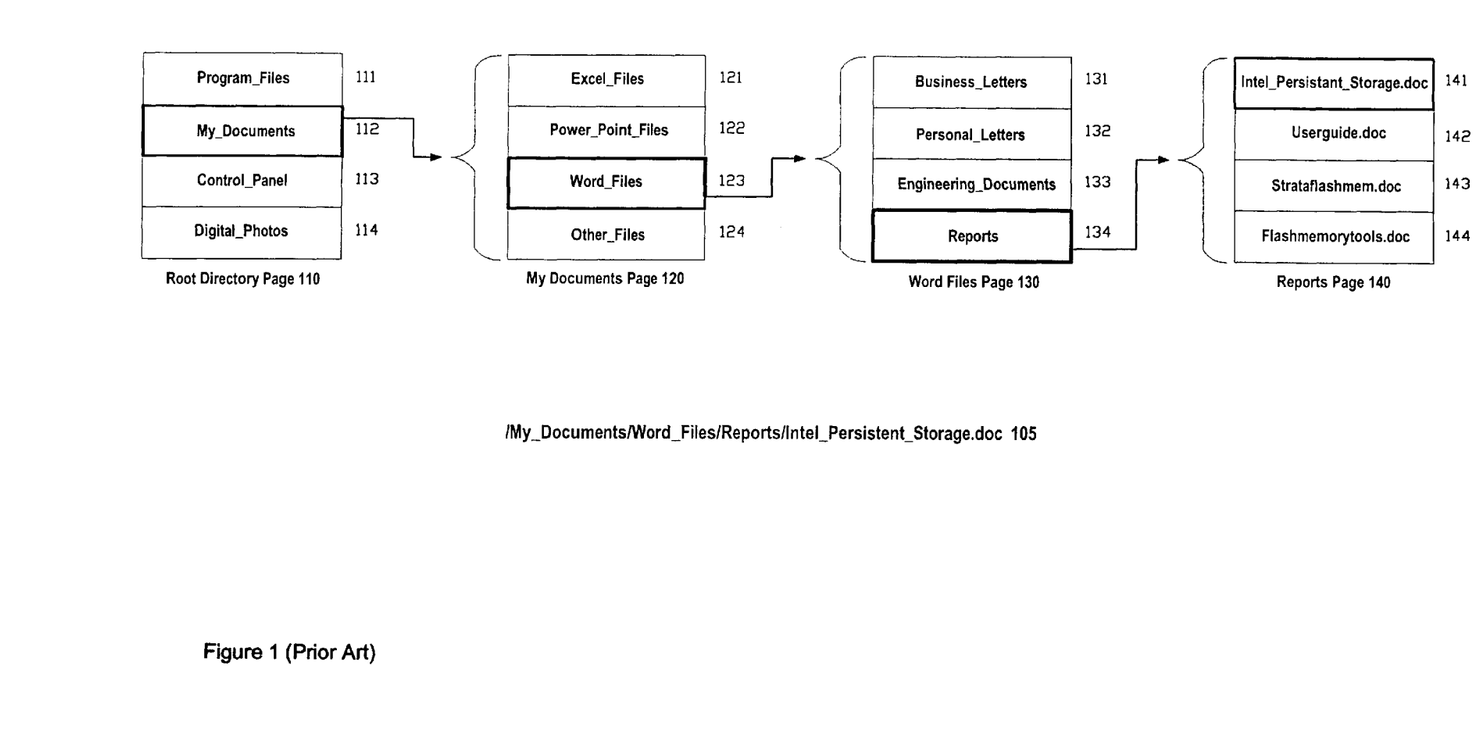
FIG. 1 is a bock diagram illustrating a prior art file directory hierarchy as may be present in a prior art file management architecture.
Figure 2:
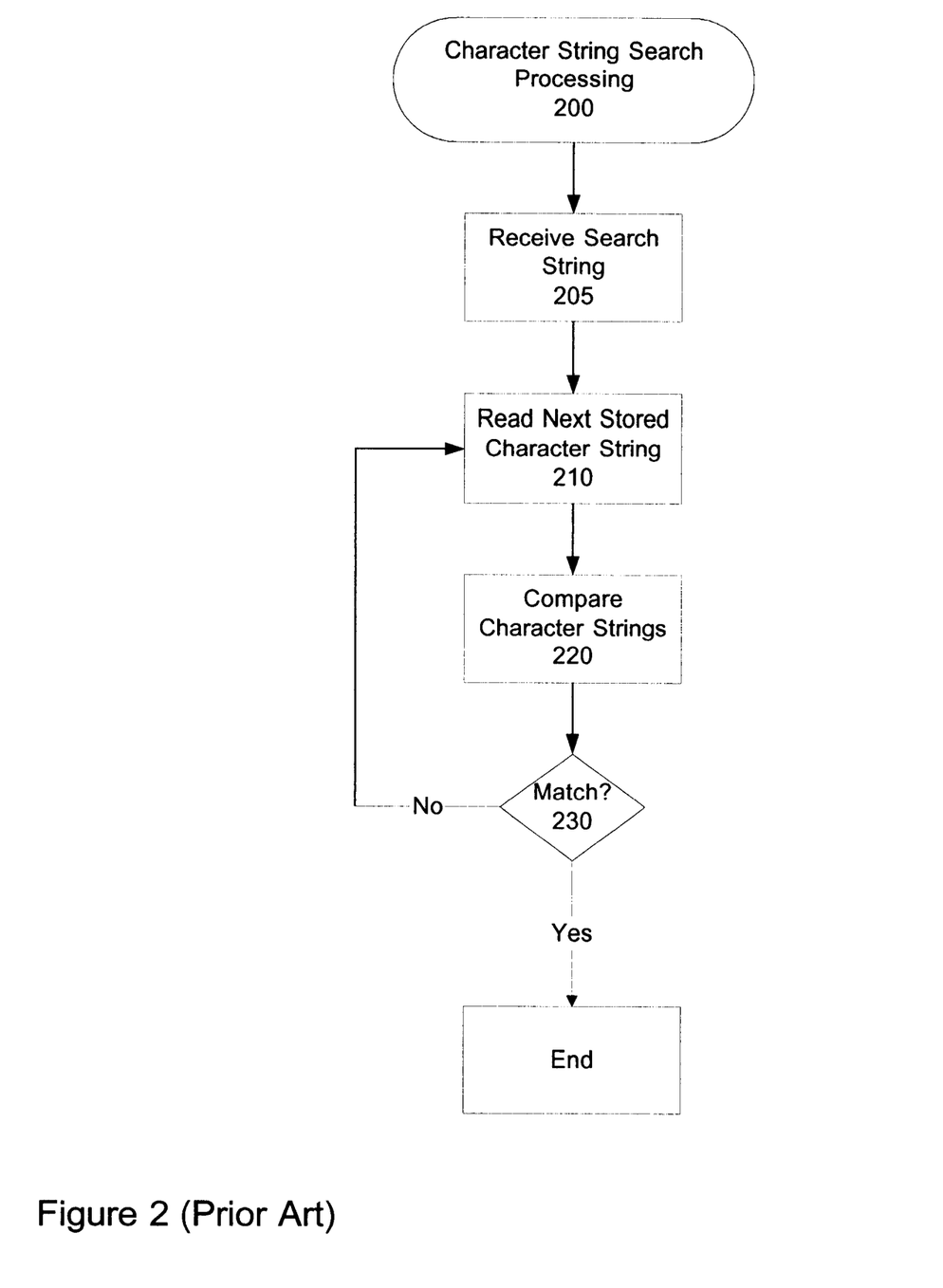
FIG. 2 is a flow diagram illustrating prior art search processing.

FIG. 1 illustrates a general directory hierarchy that may exist in a prior art computer file system, such as a file system utilized under any of the Windows® platforms, and the progression through the directory hierarchy traversed in performing a search for a file or directory. A user may enter a file path character string such as indicated by file path 105 when using the find function provided with the operating system, or the user may click on a shortcut resident on the computer desktop which will invoke the operating system's search function to find the file according to a preset file path 105. FIG. 2 is a flow diagram illustrating prior art search processing that may be followed.

After a file path search string 105 is received in block 205, the search processing begins in the Root Directory page 110. In block 210, the first entry in the Root Directory page, "Program_Files" 111 is read. The character string, "My_Documents," from the file path 105 is compared to the first Root Directory page entry in block 220. Since the two character strings do not match, the processing proceeds, as shown in decision block 230, back to block 210 where the next character string 112 in the Root Directory page 110 is read and the comparison processing of block 220 is repeated for the second entry in the Root Directory page 110. Since "My_Documents" 112 in the Root Directory page 110 matches the Root Directory file path character string, the processing for this directory page is complete as indicated by block 240. The search processing proceeds to the My Documents Directory page 120 where FIG. 2 processing is repeated by comparing data elements 121, 122 & 123 with the search character string "Word_Files" until a match is found between the file path directory name, "Word_Files" and the third entry 123. Next, the same processing is repeated for both the Word Files Directory page 130 and the Reports Directory page 140 until the "Intel_Persistant_Storage.doc" file name 141 is located. Presumably, the filename contains a pointer to the actual file permitting it to be retrieved.

One draw back of searching using character strings is the time and processing capacity necessary to perform the multiple comparisons. For instance, using a 32 bit processor only 4 characters of a character string may be transferred over a processor bus every processor cycle. Accordingly, even if it assumed that the comparison between the character strings require no extra cycles for comparison processing, a total of 7 cycles would be required just to access the character string, "Intel_Persistent_Storage.doc" 141 from the Reports directory page 140. This problem is compounded as the numbers of comparisons performed to find a match are increased. For example, the file path search discussed above and illustrated in, FIG. 1 would require 41 cycles using a 32 bit processor just to access all necessary character strings. The problem is compounded in that character strings may be very long. For instance, file names of up to 512 characters are supported in the Windows® environment.

Hashing is a common and well known method of storing data that facilitates quick access of the data. Hashing generally involves the transformation of data, such as a character string that has meaning to a user, into a value or number that identifies the location of the corresponding data in a structure called a hash table. For example, a hash value of 116 might signify the $116^{th}$ row in the related hash table. In order to find the data associated with hash value 116, it is not necessary to search through a list of hash values until the hash value 116 is located, rather the $116^{th}$ row in the table need only be accessed to find the desired data element or a pointer thereto. In certain instances, two data elements may have the same hash value requiring a mechanism whereby a compare is performed to distinguish between the data elements to determine which data element is desired.

The method of using the hash value to look up data in a hash table requires the creation of a hash table with as many rows as there are possible hash values and the reservation of physical memory space related to the operation and management thereof. Therefore, this method of accessing data may not be practical in situations where the number of distinct data elements and the hash values associated therewith are extremely large or practically unbounded requiring the reservation of a significant amount of memory space.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus are described for providing an efficient manner to locate data in a memory device. According to various aspects of the present invention, the use of a stored hash allows faster comparisons and therefore more efficient location and retrieval of values from memory.

In the following description, for the purposes of explanation, numerous specific details are set forth in order to provide a thorough understanding of the present invention. The invention is described herein primarily in terms of a file directory system utilized to access file and directory stored in memory. The invention is, however, not limited to this particular embodiment alone. For instance, the claimed method and apparatus may be used in conjunction with a database where it is necessary to search fields to locate desired database records. It is contemplated that embodiments of the invention will have applicability in any computer-based product that requires data to be searched and located. In this vain, the detailed description provided herein is not intended to limit the scope of the invention as claimed. To the contrary, embodiments of the claims have been contemplated that encompass the full breadth of the claim language. Accordingly, the present invention may be practiced without some of the specific detail provided herein.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may; also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

In one preferred embodiment, the invention is incorporated into a flash memory management system utilized in conjunction with an apparatus running in a Windows CE® (or equivalent) environment.

An Exemplary Computer System

Figure 3:
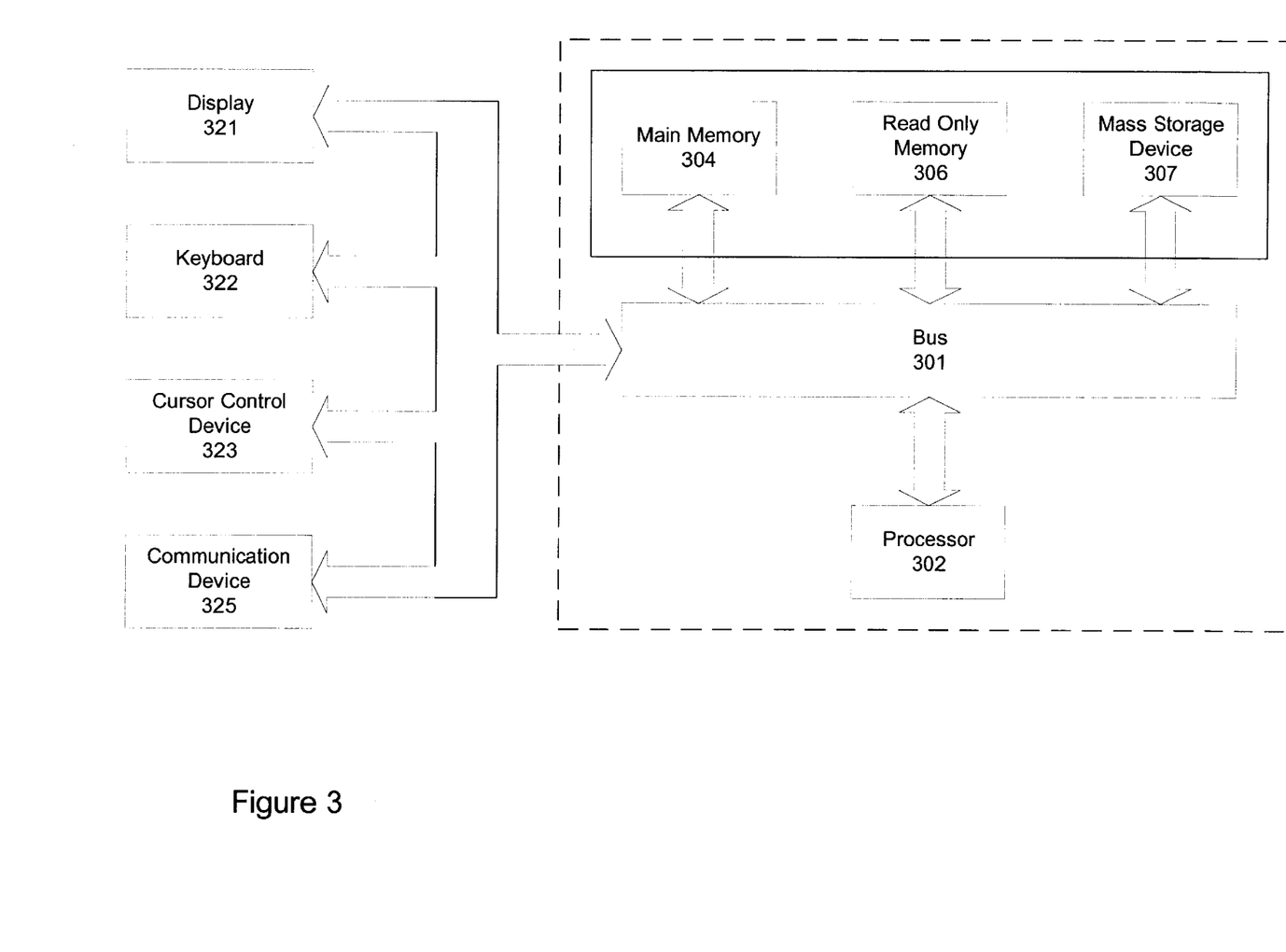
FIG. 3 is an illustration of an exemplary computer system on which embodiments of the invention may be practiced.

FIG. 3 is an example of a typical computer system upon which one embodiment of the present invention may be implemented.

Computer system 300 comprises a bus or other communication means 301 for communicating information, and a processing means such as processor 302 coupled with bus 301 for processing information. Computer system 300 further comprises a random access memory (RAM), flash memory, or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 may also comprise a read only memory (ROM) and/or other static storage device 306 coupled to bus 301 for storing static information and instructions for processor 302. A data storage device 307 such as a magnetic disk or optical disc and its corresponding drive may also be coupled to computer system 300 for storing information and instructions. In certain architectures, such as a computer running Windows CE®, main memory 304 may consist of one or more flash memory devices with the one or more flash memory devices performing all the functions of the ROM 306, main memory 304, and the mass storage device 307

Computer system 300 can also be coupled via bus 301 to a display device 321, such as a cathode ray tube (CRT) or Liquid Crystal Display (LCD), for displaying information to an end user. Typically, an alphanumeric input device 322, including alphanumeric and other keys, may be coupled to bus 301 for communicating information and/or command selections to processor 302. Another type of user input device that may be included in the computer system 300 is a cursor control 323, such as a mouse, a trackball, a pen in conjunction with a touch sensitive screen, or cursor direction keys for communicating direction information and command selections to processor 302 and for controlling cursor movement on display 321.

A communication device 325.is also coupled to bus 301. The communication device 325 may include a modem, a network interface card, or other well-known interface devices, such as those used for coupling to Ethernet, token ring, or other types of physical attachment for purposes of providing a communication link to support a local or wide area network, for example. In this manner, the computer system 300 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 300 will vary from implementation to implementation depending upon numerous factors, such as price constraints, performance requirements, technological improvements, and/or other circumstances.

It should be noted that, while the steps described herein may be performed under the control of a programmed processor, such as processor 302, in alternative embodiments, the steps may be fully or partially implemented by any programmable or hardcoded logic, such as Field Programmable Gate Arrays (FPGAs), TTL logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited steps are performed by a specific combination of hardware components.

An Exemplary Data Format

Figure 4:
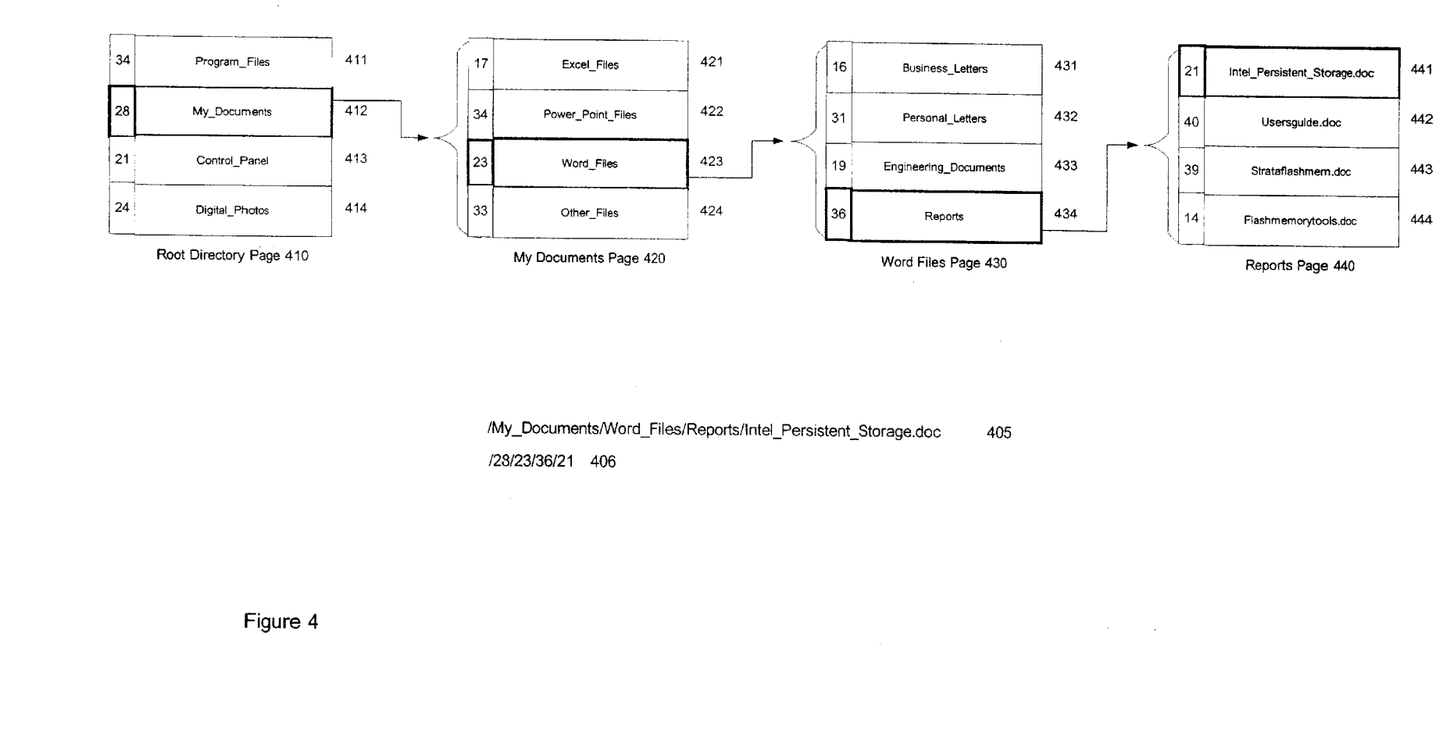
FIG. 4 is a block diagram illustrating an embodiment of a file directory hierarchy as may be utilized according to one embodiment of the invention.

FIG. 4 is a block diagram illustrating an embodiment of a file directory hierarchy as may be utilized according to one embodiment of the invention. For ease of comparison, the hypothetical directory pages and entries therein are identical to those illustrated in prior art FIG. 1. The primary distinction between the manner in which data elements are stored in FIG. 1 and FIG. 4 is the addition of hash values stored on the same lines of the directory tables as the directory or file names from which they were derived. In other embodiments, the hash values may be associated with their respective data elements by way of pointers.

The hash values may be derived from their respective data elements using any number of functions that are well known to those skilled in the art. In some embodiments, the function may be such that an essentially unique hash value is created for each applicable data element. In other embodiments, more than one data element may share the same hash value, thereby requiring a comparison to be performed between the search data element and the stored data element to validate any hash value match. It is to be appreciated that the hash function may be tuned for maximum performance by balancing the average number of hash value searches that will need to be performed to generate a hash value match with the number of data element comparisons that will need to be performed to validate the hash value match when more than one data element might have the same hash value. In the FIG. 4 example, an extremely simple hash function was applied to the directory and file names for purposes of illustration: the numerical representations of the first and fifth alphanumeric characters were added together. As can be ascertained upon reviewing FIG. 4, there are two directory names that share the same hash value, but they are located in separate directory pages.

In a preferred embodiment, the hash values are comprised of integers, which facilitate quick comparison, although the hash values comprising other formats are possible. Unlike character strings, which often must be accessed over multiple processor cycles, as discussed above, integer values will typically be accessed in a single processor cycle. Advantageously, the number of cycles required to compare a hash value derived from a search term character string and a stored hash value derived from a stored character string is often significantly less than a direct compare of two character strings as will become apparent infra in a discussion of the exemplary search processing utilized in conjunction with the described data formats.

An Exemplary Software Architecture

Figure 5:
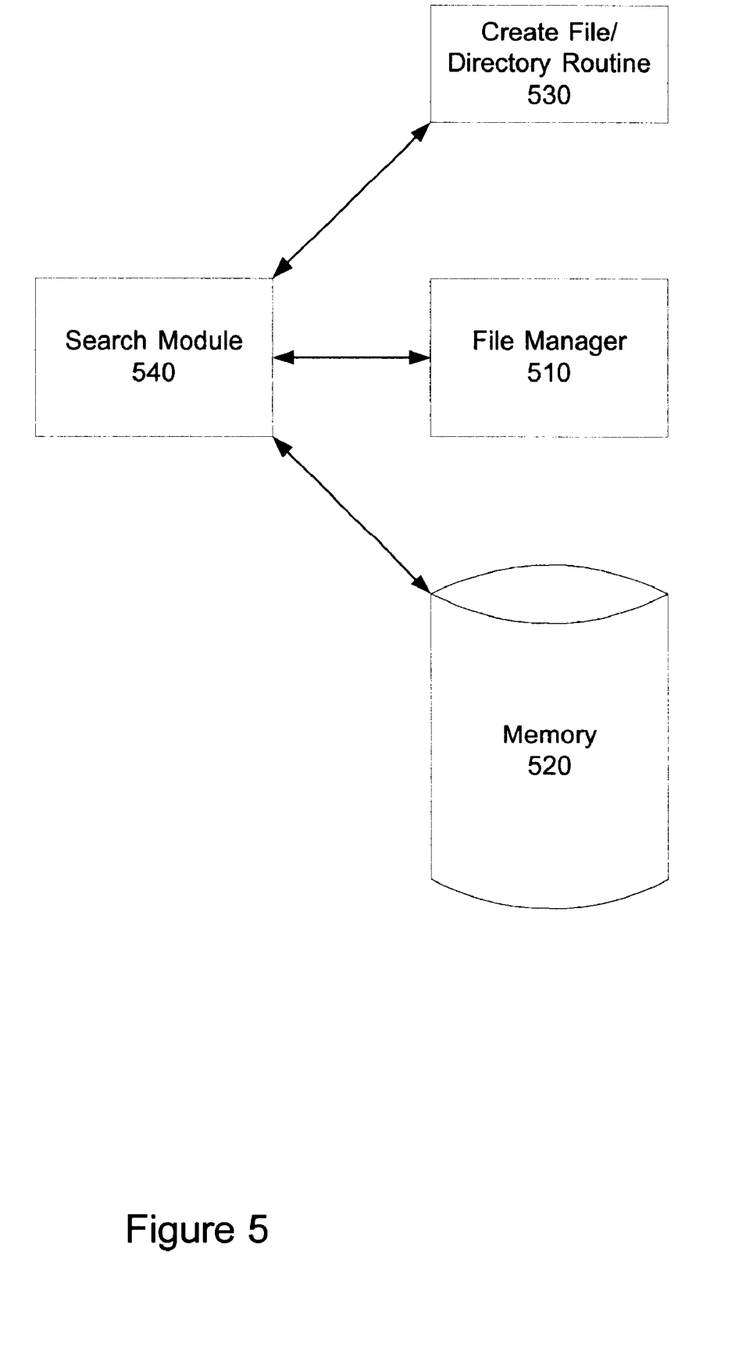
FIG. 5 is an exemplary software architecture under which embodiments of the invention may be practiced.

FIG. 5 is an exemplary software architecture under which embodiments of the invention may be practiced. It is noted that other software architectures may be utilized in implementing embodiments of the invention as would be obvious to one skilled in the art.

The file manager module 510 provides a mechanism for managing files, folders and directories with regard to their organization and storage in memory 520. The Create File/Directory Routine 530 is typically a component of the File Manager 510 that facilitates the creation and storage of new files and directories. In embodiments of the invention, the Create File/Directory Routine 530 would perform a hash function on the names of newly created files and directories to generate associated hash values. These hash values are stored in memory 520 in an associative relationship with the file and directory names from which they were derived. In some embodiments, a hash value may be stored in the same memory location as the file or directory name from which it was derived. In other embodiments, the hash value may be stored with a locator or pointer to the memory location of the associated file or directory name.

The search module 540 performs the function of locating files and directories in memory 520. It performs a hash function on the search term that is the same or similar to the hash function utilized by the Create File/Directory Routine 530 to create a search hash value. It then accesses the memory 520 directly or through the File Manager 510 to locate the file and/or directory names that match the provided search term using the search hash values as the basis for the comparisons. The file or directory names are typically associated with pointers or locators so that an associated file or directory can be accessed once the desired file or directory name is located.

Exemplary Search Processing

Figure 6A:
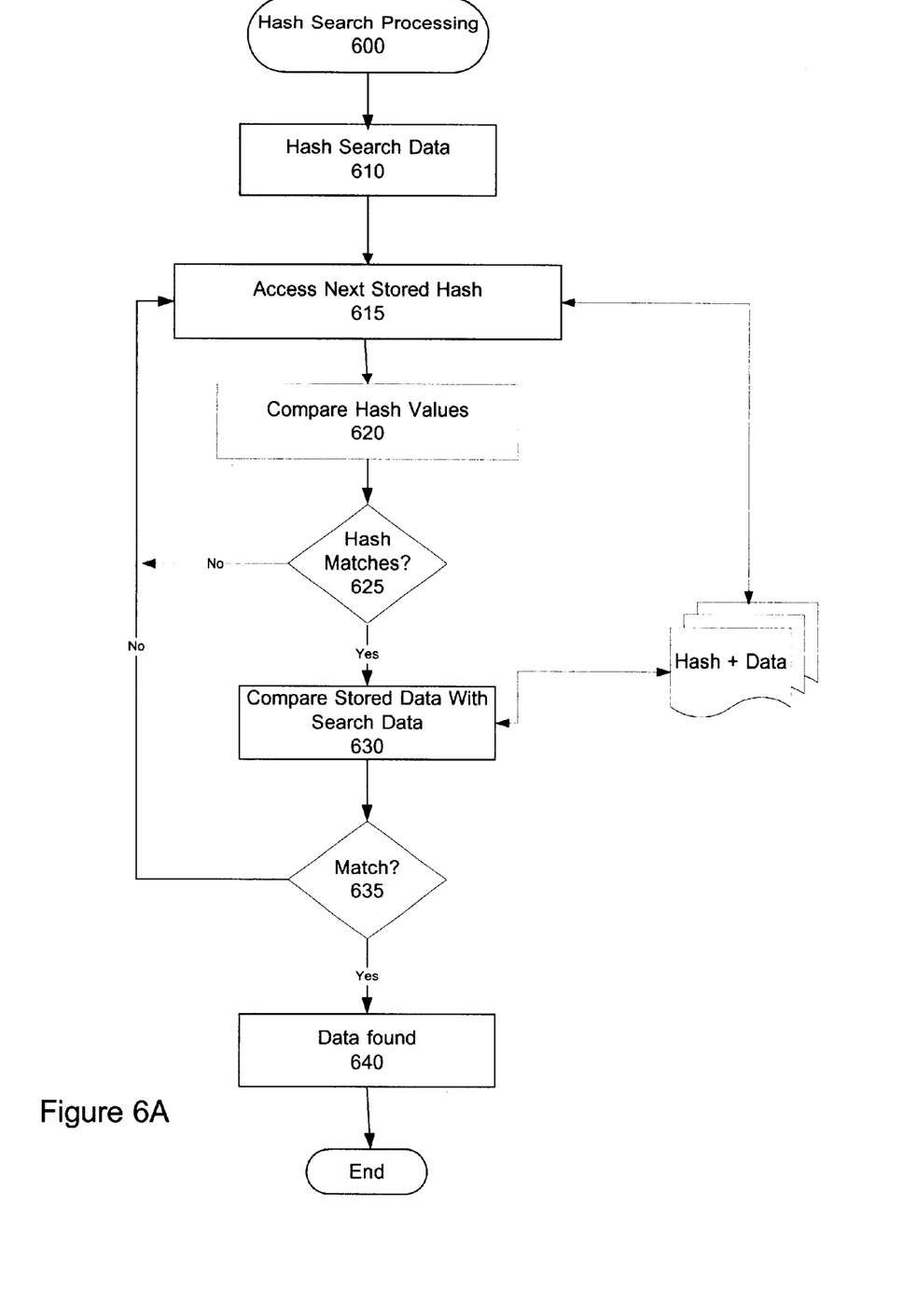
FIG. 6A is a flow diagram illustrating hash search processing according to one embodiment of the present invention.
Figure 6B:
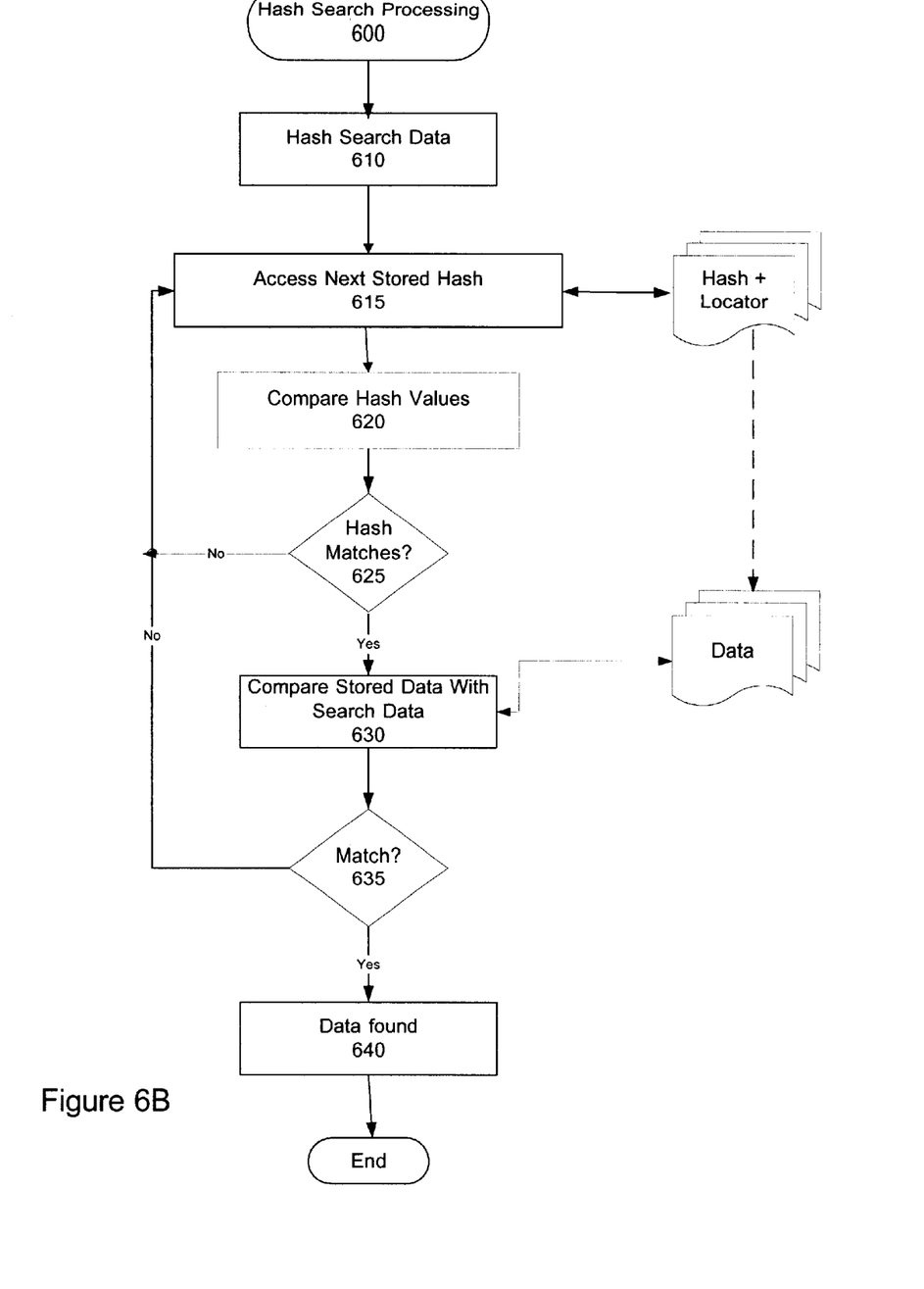
FIG. 6B is a flow diagram illustrating hash search processing according to another embodiment of the present invention.

FIG. 6A and 6B describe exemplarily search processing of two embodiments of the invention in the context of a file/directory search. Both figures are described herein with reference to the directory structure illustrated in FIG. 4.

First, a search term is received such as the file path 405 of FIG. 4. In block 610, one or more hash values are generated for the search data. The file path may be parsed and a hash value generated for each directory level in the file path name as shown by element 406, which represents the respective hash values of file path 405. A file path name or a portion thereof may be entered into a search mechanism provided by an operating system, an extension thereof, or an independent application. Additionally, in a GUI environment such as Windows® a file path, such as file path 405, may be invoked when a user clicks upon a shortcut icon appearing in a file folder or on the desktop. As would be intuitive to someone skilled in the art, the search term need not be limited to exact file path names and could comprise any portion of the desired file or directory. For example, a user might search for all files and/or directories containing the term "Intel."

In block 615, a first stored hash value is accessed from memory. In the FIG. 4 example, the stored hash value "34" associated with the directory "Program_Files" 411 would be accessed. The hash value "28" representing the "My_Documents" term in file path 405 is compared with the accessed hash value of "34" in block 620. Since the terms do not match as determined in block 625, the processing sequence loops back to block 615 where the next hash value is accessed. In the FIG. 4 example, the stored hash value "28" associated with the "My_Documents" element 412 is read. The stored hash value is compared to the hash value "28" of file path 405 and a match is found.

In an embodiment of the invention where the hash value is not necessarily a unique representation of each file or directory, it is necessary to access the file/directory name associated with the hash value "28" as shown in block 630, and compare the stored file/directory name with the relevant search term. In the FIG. 4 example, a character string compare is performed to verify that the "My_Documents" character string as it appears in the search file path 405 matches the stored directory name, "My_Documents" 412. In this example the character strings match, indicating that the appropriate directory has been located in the Root Directory page 410, and the search processing can proceed to the My Documents Directory page 420 to locate the directory/file name contained therein that matches the term, "Word_Files" from file path 405. Ultimately, the processing will proceed through the various directory pages of FIG. 4 until the file "Intel_Persistant_Storage.doc" 441 is located.

If the names fail to match in block 635 despite having the same hash value, as would be the case in a search for the directory name "Power_Point_Files" performed in the Root Directory page 410, the search processing would loop back to block 615 and access the next hash value in the Root Directory page 410.

The number of processor cycles required to complete the search indicated by file path 405 utilizing the search processing exemplified in FIG. 6A is significantly less than is required to perform the same search using the prior art file/directory structure of FIG. 1 and the prior art search processing of FIG. 2. For example, only 17 processor cycles would be required complete the search: 10 cycles to access all of the necessary hash values, and an additional 7cycles to access the file name, "Intel_Persistant_Storage.doc" 141 to perform the match validation.

In the described examples, the search hash value has been identical to the hash value of the stored file/directory name. This need not be the case in all embodiments of the invention. In certain instances a match condition in block 625 might be satisfied when the two compared hash values are not identical but meet certain match criteria. One can surmise that it would be likely that a search term comprising a partial file name would not always generate the same hash value as the complete file name, yet it may desirable to be able to search for files using partial file names.

FIG. 6B illustrates search processing similar to that illustrated in the FIG. 6A flow diagram save for the storage locations of the stored hash values and the data elements they were derived from. In FIG. 6A, the hash values are stored in the same location as their associated data elements. Only the hash portion is accessed by processing block 615 as is necessary to perform the hash value compare. Similarly, only the data element portion is accessed by processing block 630 when performing the data element compare. In FIG. 6B, the hash value and the data element from which it is derived are stored in separate memory locations. A locator or pointer is stored with each hash value that indicates the location in memory of its associated data element.

Alternative Embodiments

The invention as embodied by the claims has applicability in a number of areas beyond the file management context as would be obvious to someone with skill in the art. For instance, the hash values could be generated and stored in association with database fields, wherein searches of said fields could be accomplished using hash values to identify the database records containing the desired search information. Ultimately, claimed embodiments of the invention have applicability in any software product that requires the lookup of data.

The description provided herein has been discussed in terms of a sequential search methodology performed on directory pages. It is to be understood that other embodiments of the invention may utilize other search methodologies that are not necessarily sequential as would be obvious to one skilled in the art.

We claim:

1. A method comprising:

receiving a file path search string;

generating a search hash value for the file path search string;

searching a data structure for a stored hash value having a same value as the search hash value, the data structure including a plurality of data elements corresponding to file names associated with computer files, a plurality of integer values, each integer value of the plurality of integer values derived by performing a bash function on a data element of the plurality of data elements, each integer value being stored in an associative relationship with the data element of the plurality of data elements from which the integer was derived, the data structure further including a plurality of datasets, each dataset of the plurality of datasets stored in an associative relationship with at least one data element of the plurality of data elements; and locating a file name associated with the stored hash value, wherein the file name is associated with a computer file.

2. The method of claim 1 further comprising:

determining whether the file name matches the file path search string.

3. The method of claim 1, further comprising retrieving the computer file.

4. The method of claim 1, wherein the stored hash value is resident in the same memory location as the file name.

5. The method of claim 4, wherein a single reference provides access to both the stored hash value and the file name.

6. The method of claim 1, wherein the stored hash value includes a pointer to the associated file name.

7. The method of claim 1, further comprising receiving the file path search string from a user.

8. The method of claim 1, wherein the computer file comprises a directory file.

9. A method comprising:

generating a hash value for a file name, the file name associated with a computer file;

associating the hash value with the file name;

storing the file name and the hash value in a data structure comprising a plurality of data elements corresponding to file names and a plurality of integer values derived by performing a hash function on a data element of the plurality of data elements, each integer value being stored in an associative relationship with the data element of the plurality of data elements from which the integer value was derived, each integer value stored in the same memory location as the data element from which the integer value was derived.

10. The method of claim 9 further comprising:

receiving the file name to be stored from a user.

11. The method of claim 9, wherein the computer file name includes the file path.

12. A computer system comprising:

a data structure including a plurality of data elements corresponding to file names and a plurality of integer values derived by performing a hash function on a data element of the plurality of data elements, each integer value being stored in an associative relationship with the data element of the plurality of data elements from which the integer value was derived, the data structure further including a plurality of datasets, each dataset stored in an associative relationship with at least one data element of the plurality of data elements; and a processor capable of receiving and executing machine-readable code, the processor configured to, generate a first hash value derived from a first data element corresponding to a file name, the file name associated with a computer file, send the first data element and the first hash value to the data structure for storage, receive a file path search string, generate a search hash value derived from the file path search string, compare the search hash value to the first hash value, and if the search hash value and the first hash value match, locate the first data element within the data structure.

13. The system of claim 12, wherein the processor is further configured to retrieve the computer file associated with the first data element from the one or more memory devices.

14. Machine-readable media for storing data comprising:

a data structure including, a plurality of data elements corresponding to file names, the file names associated with computer files, a plurality of datasets, each dataset of the plurality of datasets stored in an associative relationship with at least one data element of the plurality of data elements, and a plurality of integer values, each integer value of the plurality of integer values derived by performing a hash function on a data clement of the plurality of data elements, each integer value being stored in an associative relationship with the data element of the plurality of data element from which the integer value was derived.

15. The machine-readable media of claim 14, wherein each integer value is stored in the same memory location as the data element from which the integer value was derived.

16. Machine-readable media for storing data comprising:

a data structure including, a directory table;

a plurality of file names, the file names associated with computer files, the plurality of file names stored within the directory table; and a plurality of hash values, each bash value of the plurality of hash values derived by performing a function on a file name of the plurality of file names, each hash value-stored in the same memory location as the file name from which each hash value was derived.

17. The machine-readable media of claim 16, wherein the data structure further comprises a pointer to a location in memory containing the computer file associated with the file name.

18. The media of claim 16, wherein at least one of the computer files comprises a directory file.

19. A machine-readable medium having stored thereon data representing sequences of instructions, and the sequences of instructions which, when executed by a processor, cause the processor to:

receive a file pat search string;

generate a search hash value for the file path search string using a hash function;

search a data structure for a stored hash value having a same value as the search hash value, searching a data structure for a stored hash value having a same value as the search hash value, the data structure including a plurality of data elements corresponding to file names associated with computer files, a plurality of integer values, each integer value of the plurality of integer values derived by performing a hash function on a data element of the plurality of data elements, each integer value being stored in an associative relationship with the data element of the plurality of data elements from which the integer was derived, the data structure further including a plurality of datasets, each dataset of the plurality of datasets stored in an associative relationship with at least one data element of the plurality of data elements;

locate a file name associated with the stored hash value, wherein the file name is associated with a computer file; and determine whether the file name matches the file path search string.

20. The machine-readable medium of claim 19, wherein the sequence of instructions when executed by a processor, further cause the processor to:

retrieve the computer file.

21. The machine-readable medium of claim 20, wherein the stored hash value and the file name are stored in the same memory location and single reference provides access to both the stored hash value and the file name.

22. The medium of claim 19, wherein the computer file comprises a directory file.

* * * * *